United States Patent
Zuo

(10) Patent No.: US 10,397,649 B2
(45) Date of Patent: Aug. 27, 2019

(54) METHOD OF ZOOMING VIDEO IMAGES AND MOBILE DISPLAY TERMINAL

(71) Applicant: TENCENT TECHNOLOGY (SHENZHEN) COMPANY LIMITED, Shenzhen, Guangdong (CN)

(72) Inventor: Hongtao Zuo, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days.

(21) Appl. No.: 15/681,192

(22) Filed: Aug. 18, 2017

(65) Prior Publication Data

US 2017/0347153 A1    Nov. 30, 2017

Related U.S. Application Data

(63) Continuation of application No. PCT/CN2016/078352, filed on Apr. 1, 2016.

(30) Foreign Application Priority Data

Apr. 16, 2015 (CN) .......................... 2015 1 0181200

(51) Int. Cl.
*H04N 21/4402* (2011.01)
*G06F 3/0484* (2013.01)
*G06F 3/0481* (2013.01)

(52) U.S. Cl.
CPC ... *H04N 21/440263* (2013.01); *G06F 3/0481* (2013.01); *G06F 3/0484* (2013.01);
(Continued)

(58) Field of Classification Search
CPC ... H04N 21/440263; H04N 21/440272; H04N 5/23216; H04N 5/23293; H04N 5/23296;
(Continued)

(56) References Cited

U.S. PATENT DOCUMENTS 6,400,852 B1* 6/2002 Miller, II ............. G06T 3/4007
                                                        345/660
8,817,052 B2* 8/2014 Kudo .................... G06F 3/0481
                                                        345/472
(Continued)

FOREIGN PATENT DOCUMENTS

CN        101325040 A    12/2008
CN        102377960 A    3/2012
(Continued)

OTHER PUBLICATIONS

International Preliminary Report on Patentability Issued in International Application No. PCT/CN2016/078352 dated Oct. 17, 2017.
(Continued)

*Primary Examiner* — Twyler L Haskins
*Assistant Examiner* — Akshay Trehan
(74) *Attorney, Agent, or Firm* — Knobbe Martns Olson & Bear LLP

(57) ABSTRACT

The present disclosure provides a method and an apparatus for zooming video images, and belongs to video playing technology. The method may include: receiving a zoom request for zooming a current video frame while a video is being played; determining a zoom center point and a zoom ratio according to the zoom request; determining a target image area to be displayed in a playing window from the current video frame after zooming according to the zoom center point and the zoom ratio; and rendering, in the playing window, image content within the target image area of video frames subsequent to the current video frame when playing subsequent video frames. As such, a user is enabled to selectively zoom video frames according to the needs, thus can clearly see details in the video.

17 Claims, 8 Drawing Sheets

(52) U.S. Cl.
CPC ...... *G06F 3/04845* (2013.01); *G06F 3/04847* (2013.01); *H04N 21/4402* (2013.01); *G06F 2203/04806* (2013.01)

(58) Field of Classification Search
CPC . H04N 5/2628; G06F 3/0481; G06F 3/04845; G06F 3/04847; G06F 2203/04806; G06F 3/0416
See application file for complete search history.

(56) References Cited

U.S. PATENT DOCUMENTS

| | | | | |
|---|---|---|---|---|
| 2010/0026721 | A1* | 2/2010 | Park | G06F 3/0481 345/660 |
| 2012/0092381 | A1* | 4/2012 | Hoover | G06F 3/04883 345/662 |
| 2013/0009997 | A1* | 1/2013 | Boak | G09G 5/00 345/661 |
| 2013/0083078 | A1 | 4/2013 | Dai et al. | |
| 2014/0282061 | A1* | 9/2014 | Wheatley | H04N 21/431 715/745 |
| 2015/0268822 | A1* | 9/2015 | Waggoner | G06F 3/04842 715/722 |

FOREIGN PATENT DOCUMENTS

| | | | | |
|---|---|---|---|---|
| CN | 103888840 | A | 6/2014 | |
| CN | 104238863 | * | 12/2014 | ............ G06F 3/048 |
| CN | 104238863 | A | 12/2014 | |
| CN | 104469398 | A | 3/2015 | |
| CN | 104822088 | A | 8/2015 | |
| KR | 10-2012-0024058 | A | 3/2012 | |
| KR | 10-2014-0133081 | A | 11/2014 | |

OTHER PUBLICATIONS

Office Action Issued in Chinese Application No. 201510181200.6 dated Jun. 2, 2017.
International Search Report with Translation for International Application No. PCT/CN2016/078352 dated Jun. 3, 2016.
Office Action with Translation for Korean Patent Application No. 10-2017-7018479 dated May 25, 2018.
Office Action with Explanation of Relevance Issued in Chinese Application No. 201510181200.6 dated Oct. 9, 2018.

* cited by examiner

METHOD OF ZOOMING VIDEO IMAGES AND MOBILE DISPLAY TERMINAL

The present disclosure is a continuation application of PCT/CN2016/078352, which claims priority to Chinese patent application No. 2015101812006 titled "method and apparatus of zooming video images" filed on Apr. 16, 2015 with the Patent Office of the People's Republic of China, each of which is hereby incorporated by reference in its entirety. Any and all applications for which a foreign or domestic priority claim is identified in the Application Data Sheet as filed with the present application are hereby incorporated by reference in their entirety under 37 CFR 1.57 for all purposes.

TECHNICAL FIELD

The present disclosure relates to video play techniques, and particularly to a method of zooming video images and mobile terminal.

BACKGROUND

When watching a video using a mobile terminal, a user may be unable to clearly see details in video images due to the limited size of the playing window.

In order to help the user see details in the video clearly, a solution may be as follows. While playing a video, a mobile terminal receives from the user a switch request for switching the display mode into full screen. Then the video is displayed at full screen after the switch request is received.

SUMMARY

In order to solve some of problems in related solutions, various embodiments of the present disclosure provide a method of zooming video images and a mobile terminal. The technical schemes are as follows.

In one aspect, various embodiments provide a method of zooming video images which may include:

receiving a zoom request for zooming a current video frame while a video is being played;

determining a zoom center point and a zoom ratio according to the zoom request;

determining a target image area to be displayed in a playing window from the current video frame after zooming according to the zoom center point and the zoom ratio; and rendering, in the playing window, image content within the target image area of subsequent video frames of the current video frame when playing the subsequent video frames.

In another aspect, embodiments also provide a mobile terminal which may include:

at least one processor; and a storage device;

the storage device which stores at least one program executable by the at least one processor, the at least one program includes instructions for:

receiving a zoom request for zooming a current video frame while a video is being played;

determining a zoom center point and a zoom ratio according to the zoom request;

determining a target image area to be displayed in a playing window from the current video frame after zooming according to the zoom center point and the zoom ratio; and rendering, in the playing window, image content within the target image area of subsequent video frames of the current video frame when playing the subsequent video frames.

The technical scheme provided by embodiments of the present disclosure has the following merits.

By receiving a zoom request, determining a target image area to be displayed in a playing window from the current frame after zooming according to the zoom request, image in the target image area in each frame is rendered in the playing window when presenting each frame subsequent to the current frame. Thus, the technical scheme solves the problem that the user may be unable to see details in a video clearly even after the video is played at full screen, e.g., the problem that the related art cannot satisfy user demands. As such, a user is enabled to selectively zoom video frames according to the needs, thus can clearly see details in the video.

BRIEF DESCRIPTION OF THE DRAWINGS

In order to make the technical scheme of embodiments of the present disclosure more clearly, the following is a brief introduction of the drawings used in description of the embodiments. The following drawings are merely some of the embodiments, and based on which other drawings can be obtained by those skilled in the art without doing any inventive work.

DETAILED DESCRIPTION

Examples are hereinafter described in detail with reference to the accompanying drawings to make the objective, technical scheme and merits more apparent. It should be understood that the embodiments described are merely some examples of the present disclosure, not all of the embodiments. Based on the embodiments of the present disclosure, other embodiments obtained by those skilled in the art without any inventive work done are still within the protection scope of the present disclosure.

In order to make the disclosure more readily understood, several terms involved in the embodiments are briefly introduced herein.

Figure 1A:
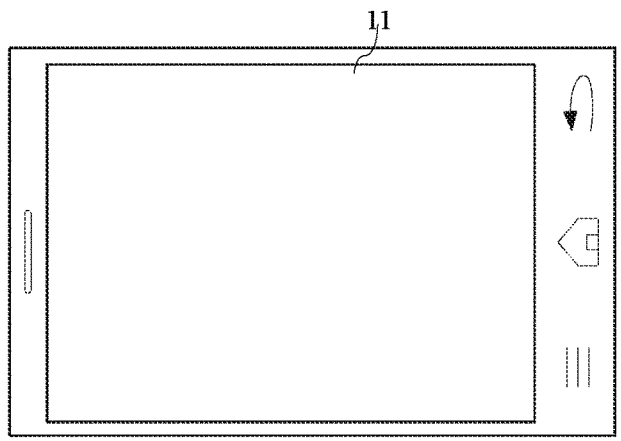
FIGS. 1A and 1B are schematic diagrams illustrating a playing window in accordance with embodiments of the present disclosure.
Figure 1B:
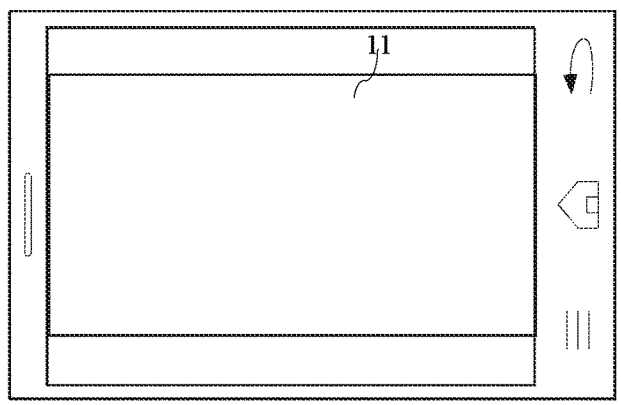

The playing interface refers to an interface provided by a player terminal for presenting videos. The playing window refers to an area actually occupied by video frames in the playing interface. According to examples, the size of a playing window may be the same with that of a playing interface, or may be different from that of a playing interface. For example, referring to FIG. 1A, when a video frame occupies the whole playing interface, the size of the playing window 11 is the same with the size of the playing interface. As shown in FIG. 1B, when a video frame only occupies the area except the upper area and the bottom area (the upper area and the bottom area are generally black areas in the playing interface when a user is watching a video), the size of the playing window 11 equals the size of the playing interface.

Figure 1C:
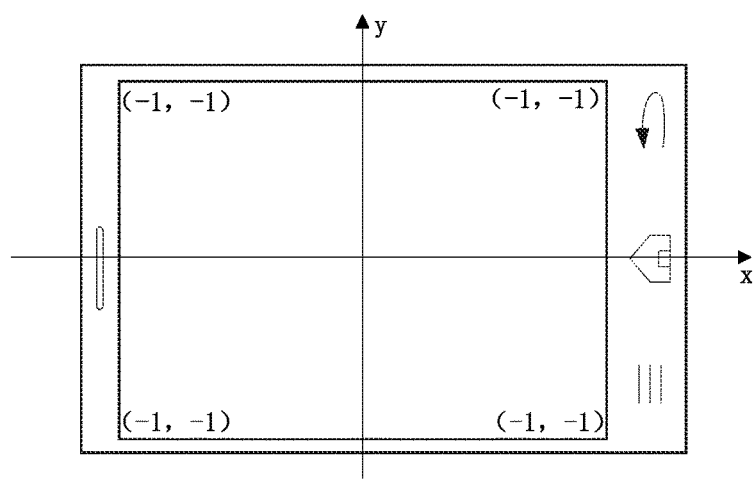
FIG. 1C is a schematic diagram illustrating a coordinate system of vertex coordinates in accordance with embodiments of the present disclosure.

Vertex coordinates refer to coordinates of each vertex of a playing window. Generally, the coordinate system of vertex coordinates is built based on a horizontal central axis x and a vertical central axis y of a player terminal, denoted as P. For example, the coordinate system P may be the coordinate system as shown in FIG. 1C. Vertex coordinates are coordinates of each vertex of a playing window in the coordinate system. When the playing window occupies the whole playing interface, the maximum coordinate value of vertex coordinates is generally 1. In an example, FIG. 1C shows vertex coordinates of each vertex of a playing window when the playing window occupies the whole playing interface. In other examples, those skilled in the art may also set another value as the maximum coordinate value according to the needs.

Figure 1D:
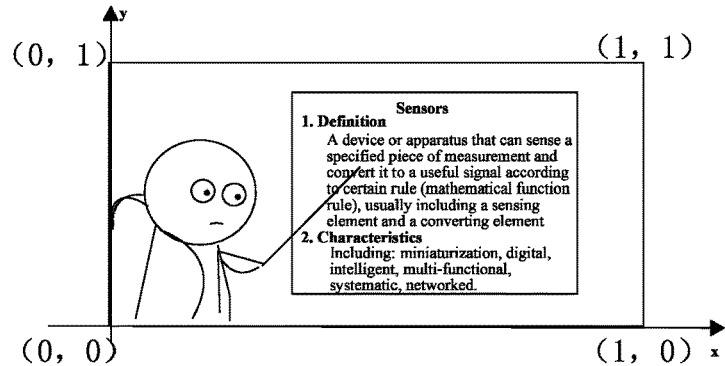
FIG. 1D is a schematic diagram illustrating a coordinate system of texture coordinates in accordance with embodiments of the present disclosure.

Texture coordinates may include coordinates of at least two vertexes of a zoomed playing window in an un-zoomed version of the current video frame. A coordinate system of the texture coordinates, denoted as Q, is set up along an edge of a current video frame with the bottom-left of the video frame as the center. For example, the coordinate system Q may be the coordinate system as shown in FIG. 1D (the maximum coordinate value of the coordinate system is generally set to be 1, and may be set to be another value by those skilled in the art according to the needs). Texture coordinates are coordinates of a to-be-presented target image area in the coordinate system. For example, referring to FIG. 1E, the target image area to be presented in the playing window in the current video frame is the area defined by A, B, C and D in the upper figure (the area defined by the dotted lines in the upper figure is an area of an un-zoomed version of the current video frame). The texture coordinates are the coordinates in the coordinate system Q of at least two points of the four points A, B, C and D in the current video frame, e.g., the coordinates of at least two points of the four points A', B', C' and D' in the lower figure of FIG. 1E. The at least two points may include two diagonal vertexes.

There are at least the following disadvantages in a conventional solution: since the screen size of mobile terminals is small, users may be unable to see details in videos even if the video is played at full screen, and the above solution still cannot satisfy the demand of users.

Figure 1E:
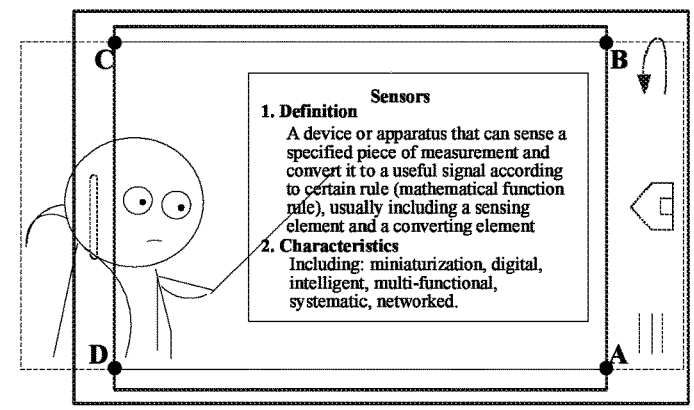
FIG. 1E is a schematic diagram illustrating texture coordinates in a coordinate system in accordance with embodiments of the present disclosure.
Figure 1E:
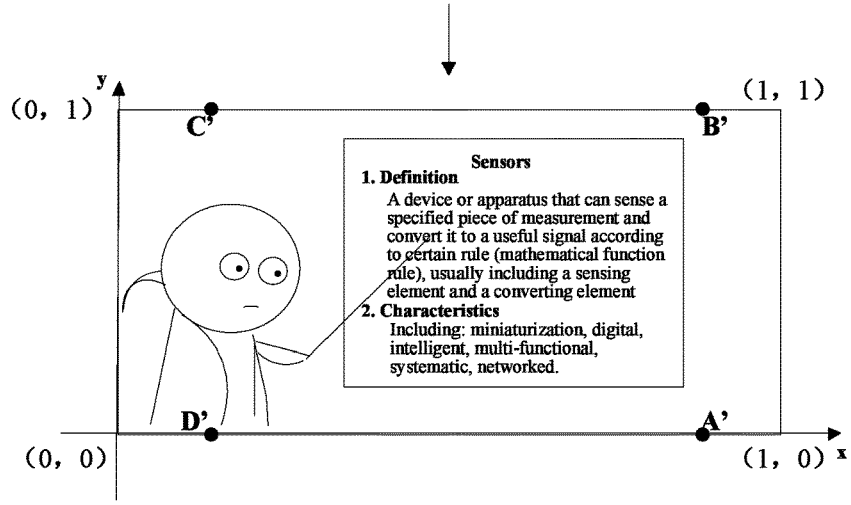
Figure 1F:
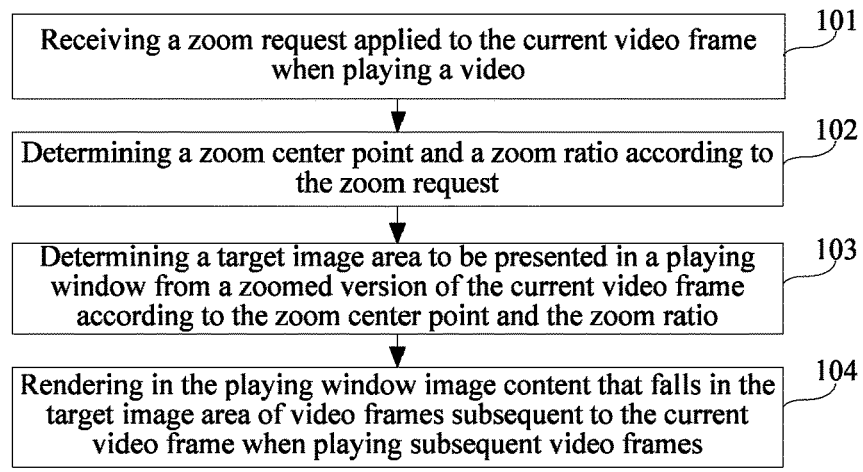
FIG. 1F is a flowchart illustrating a method of zooming video images in accordance with embodiments of the present disclosure.

FIG. 1F is a flowchart illustrating a method of zooming video images in accordance with embodiments of the present disclosure. The method of zooming video images may include the following procedures.

At block 101, a zoom request for zooming a current video frame may be received while a video is being played.

At block 102, a zoom center point and a zoom ratio may be determined according to the zoom request.

At block 103, a target image area to be displayed in a playing window may be determined from a zoomed version of the current video frame according to the zoom center point and the zoom ratio.

At block 104, image content within the target image area of subsequent video frames of the current video frame may be rendered in the playing window when the subsequent video frames are played.

In view of the foregoing, the method of various embodiments provides receiving a zoom request, determining a target image area to be displayed in a playing window from a zoomed version of the current frame according to the zoom request, so that image in the target image area in each frame subsequent to the current frame is rendered in the playing window when each frame subsequent to the current frame is played. Thus, the technical scheme solves the problem that the user may be unable to see details in a video clearly even after the video is played at full screen, e.g., the problem related art cannot satisfy demands of users. As such, a user is enabled to selectively zooming video frames according to the needs, thus can clearly see details in the video.

Figure 2A:
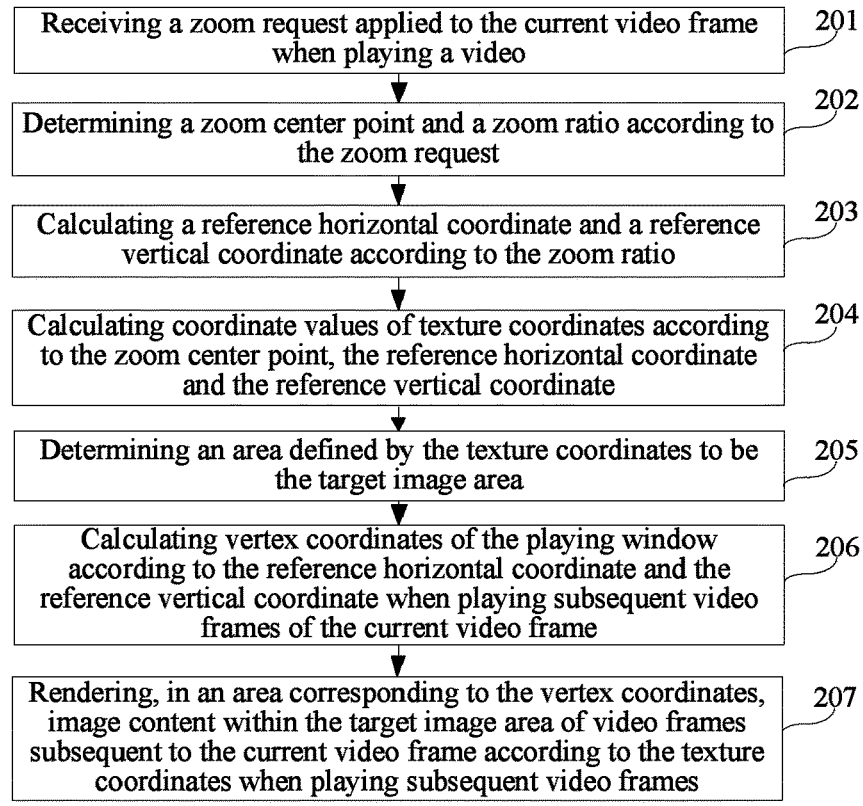
FIG. 2A is a flowchart illustrating a method of zooming video images in accordance with embodiments of the present disclosure.

FIG. 2A is a flowchart illustrating a method of zooming video images in accordance with embodiments of the present disclosure. The method of zooming video images may include the following procedures.

At block 201, a zoom request for zooming a current video frame may be received while a video is being played.

The method may be applied to a video player application which may be an application installed in a mobile terminal device. The mobile terminal device may be a touch-control terminal, e.g., a touch-control mobile phone, a tablet computer, a personal reader, or the like.

When the video player application is playing a video and a user wants to see a certain detail in the video interface, the user may trigger a zoom request for the current video frame. The video player application may receive the zoom request.

In an example, this procedure may be implemented in the following two manners.

According to a first manner, a stretch gesture applied to the current video frame may be received, and determined to be a magnify request.

Figure 2B:
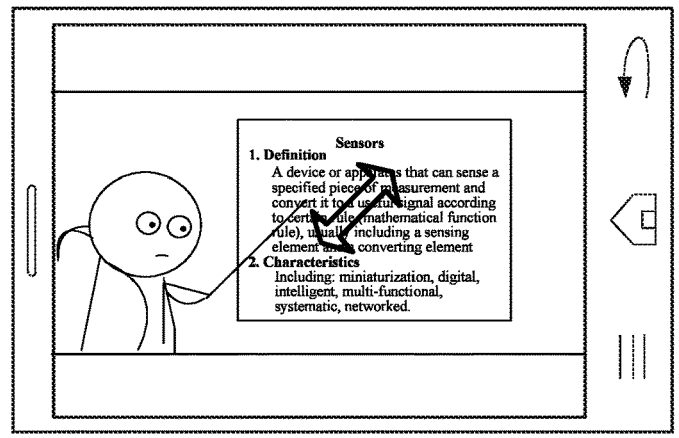
FIG. 2B is a schematic diagram illustrating a video player application when a user is zooming a current video frame in accordance with embodiments of the present disclosure.

For example, referring to FIG. 2B, when a user is watching a tutorial video and wants to magnify and view tutorial material in the tutorial video, the user may put two fingers on a target position in the playing window, and make a stretch gesture on the playing window. The video player application may determine the stretch gesture received to be a magnify request. The target position refers to the position of the center of an area the user wants to magnify to view.

According to a second manner, a minify gesture applied to the current video frame may be received, and determined to be a minify request.

Likewise, when a user wants to minify video images, e.g., after watching a magnified video for some time and wants to view the whole image contents, the user may make a minify gesture in the playing window.

In an example, before the minify request is received, the video player application may also present zoom guidance information for guiding the user to minify the video frames. The video player application may present the zoom guidance information after receiving a click signal indicating the user has clicked on the video frame. In another example, the video player application may present the zoom guidance information the first time when the video player application is run to play a video. In another example, the video player application may always present the zoom guidance information.

Figure 2C:
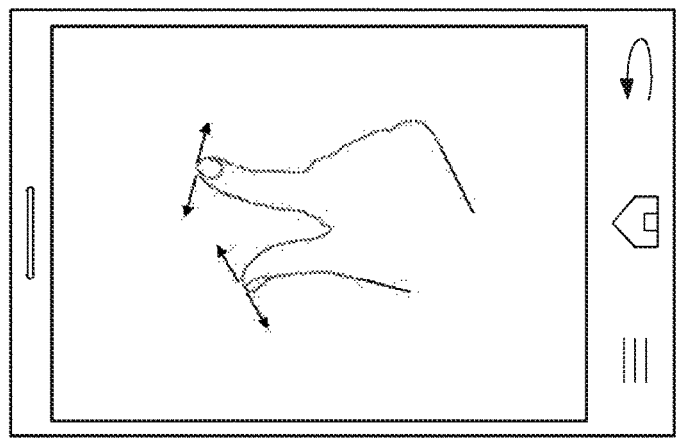
FIG. 2C is a schematic diagram illustrating zoom guidance information presented by a video player application in accordance with embodiments of the present disclosure.
Figure 2C:
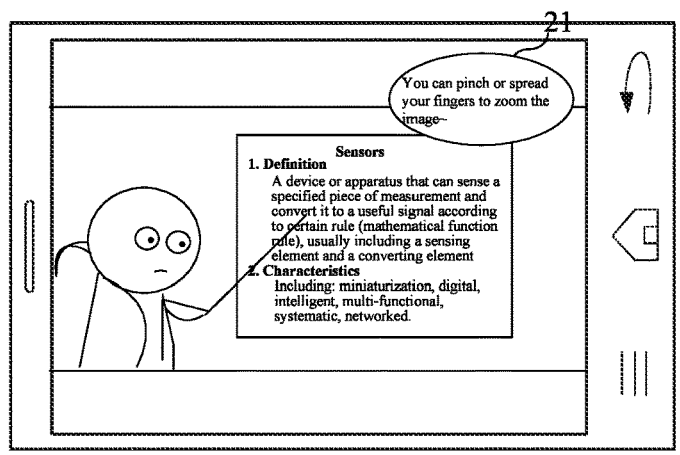

For example, taking a video player application presents zoom guidance the first time when the video player application is run to play a video as an example, as shown in the upper figure in FIG. 2C, the video player application may present the zoom guidance information as shown in the figure in a popover. In another example, referring to the lower figure of FIG. 2C, the video player application may always present the zoom guidance information 21 as shown in the figure.

At block 202, a zoom center point and a zoom ratio may be determined according to the zoom request.

After receiving the zoom request, the video player application may determine a zoom center point and a zoom ratio according to the zoom request. In an example, the video player application may respectively determine a zoom ratio for the horizontal axis and a zoom ratio for the vertical axis for zooming the current video frame. For example, taking a zoom request for magnifying the current video frame to two times of the original size and the current video frame is magnified according to the same ratio in the horizontal direction and the vertical direction, the video player application may determine the zoom ratio of the horizontal axis to be $$\frac{\sqrt{2}}{2},$$

and the zoom ratio of the vertical axis is also $$\frac{\sqrt{2}}{2}.$$

At block 203, a reference horizontal coordinate and a reference vertical coordinate may be calculated according to the zoom ratio.

In an example, when the zoom ratio determined by the video player application is smaller than 1, e.g., the zoom request is a minify request, this procedure may include:

calculating the reference horizontal coordinate to be:

$$xCord = n_x * \frac{viewHeight}{viewWidth} * \frac{ImageWidth}{ImageHeight};$$

calculating the reference vertical coordinate to be:

$$yCord = n_y * \frac{viewWidth}{viewHeight} * \frac{ImageHeight}{ImageWidth}.$$

The n is the zoom ratio for the horizontal axis of the current video frame; n is the zoom ratio for the vertical axis of the current video frame; viewWidth is the width of the displaying area of the playing window; viewHeight is the height of the displaying area of the playing window; ImageWidth is the width of the current video frame; ImageHeight is the height of the current video frame.

In an example, when the zoom ratio determined by the video player application is larger than 1, e.g., the zoom request is a magnify request, this procedure may include:

first, obtaining a first value which is $$\frac{viewHeight}{viewWidth} * \frac{ImageWidth}{ImageHeight};$$

then, determining the reference horizontal coordinate xCord to be the first value in response to a determination that the first value reaches a first threshold;

after obtaining the first value, checking by the video player application whether the first value reaches the first threshold; determining by the video player application the reference horizontal coordinate xCord to be the first threshold in response to a determination that the first value reaches the first threshold because the maximum values of the horizontal coordinate and the vertical coordinate are both the first threshold; the first threshold is generally 1;

thirdly, obtaining a second value which is $$n_y * \frac{viewWidth}{viewHeight} * \frac{ImageHeight}{ImageWidth};$$

fourthly, determining the reference vertical coordinate yCord to be the first value in response to a determination that the second value reaches the first threshold.

After obtaining the second value, the video player application may check whether the second value reaches the first threshold. The video player application may determine the reference horizontal coordinate yCord to be the first threshold in response to a determination that the second value reaches the first threshold because the maximum value of both the horizontal coordinate and the vertical coordinate can only be the first threshold.

Fifthly, a determination may be made that the reference vertical coordinate yCord is the second value in response to a determination that the second value does not reach the first threshold.

The n is the zoom ratio for the vertical axis of the current video frame; viewWidth is the width of the displaying area of the playing window; viewHeight is the height of the displaying area of the playing window; ImageWidth is the width of the current video frame; ImageHeight is the height of the current video frame.

It should be noted that after obtaining the first value, when the first value does not reach the first threshold, the video player application may determine the reference horizontal coordinate and the reference vertical coordinate according to the following method which may include the following procedures.

Firstly, the reference vertical coordinate yCord may be determined to be the first threshold in response to a determination that the first value does not reach the first threshold.

Secondly, a third value may be obtained, which may be $$n_x * \frac{viewHeight}{viewWidth} * \frac{ImageWidth}{ImageHeight}.$$

$n_x$ is the zoom ratio for the horizontal axis of the current video frame.

Thirdly, the reference horizontal coordinate xCord may be determined to be the first threshold in response to a determination that the third value reaches the first threshold.

Similar to the above method, since the maximum value of both the horizontal coordinate and the vertical coordinate can only be the first threshold, the video player application may determine the reference horizontal coordinate to be the first threshold in response to a determination that the obtained third value reaches the first threshold.

Fourthly, the reference horizontal coordinate xCord may be determined to be the third value in response to a determination that the third value does not reach the first threshold.

It should be noted that this example is taking a video player application calculating the reference horizontal coordinate and the reference vertical coordinate using the above method as an example. In other examples, a video player application may perform the calculation using other methods, and this is not limited in the present disclosure.

At block 204, texture coordinates may be calculated according to the zoom center point, the reference horizontal coordinate and the reference vertical coordinate.

After calculating the reference horizontal coordinate and the reference vertical coordinate, the video player application may calculate coordinate values of texture coordinates according to the zoom center point, the reference horizontal coordinate and the reference vertical coordinate. The texture coordinates may include coordinates of at least two vertexes of a playing window presenting a zoomed version of the current video frame in an un-zoomed version of the current video frame. The at least two vertexes may include diagonal vertexes of the playing window. This example takes the texture coordinates includes four vertexes as an example.

In an example, this procedure may include the following steps.

A target horizontal coordinate and a target vertical coordinate of the zoom center point may be obtained. The target horizontal coordinate may be:

$$X_0 = \frac{x_0}{viewWidth * n_x};$$

the target vertical coordinate may be:

$$Y_0 = \frac{y_0}{viewHeight * n_y}.$$

If the reference horizontal coordinate is smaller than the first threshold i and the reference vertical coordinate is the first threshold i, a first horizontal coordinate $X_1$ of the texture coordinates is the first threshold i, a second horizontal coordinate $X_2$ of the texture coordinates is j, a first vertical coordinate $Y_1$ of the texture coordinates is $$\frac{i}{n_y} + Y_0,$$

and a second vertical coordinate $Y_2$ of the texture coordinates is $Y_0$. When the first vertical coordinate $Y_1$ reaches the first threshold i, it is determined the first vertical coordinate $Y_1$ is the first threshold i, the second vertical coordinate $Y_2$ is $$Y_1 - \frac{i}{n_y}.$$

If the reference vertical coordinate is smaller than the first threshold i and the reference horizontal coordinate is the first threshold i, a first horizontal coordinate $X_1$ of the texture coordinates is $$\frac{i}{n_x} + X_0,$$

a second horizontal coordinate $X_2$ of the texture coordinates is $X_0$, a first vertical coordinate $Y_1$ of the texture coordinates is the first threshold i, a second vertical coordinate $Y_2$ of the texture coordinates is the second threshold j. When the first horizontal coordinate $X_1$ is larger than the first threshold i, it is determined the first horizontal coordinate $X_1$ is the first threshold i, the second horizontal coordinate $X_2$ is $$X_1 - \frac{i}{n_x}.$$

When the second horizontal coordinate $X_2$ does not reach the second threshold j, it is determined the first horizontal coordinate $X_1$ is $$\frac{i}{n_x},$$

the second horizontal coordinate $X_2$ is the second threshold j.

If the reference horizontal coordinate and the reference vertical coordinate are both the first threshold, the value of a first parameter a, the value of a second parameter b, the value of a third parameter c and the value of a fourth parameter d may be obtained. The first horizontal coordinate $X_1$ of the texture coordinates is $$\frac{i}{a/b} * c + X_0,$$

the second horizontal coordinate $X_2$ of the texture coordinates is $X_0$, the first vertical coordinate $Y_1$ of the texture coordinates is $$\frac{i}{a/b} * d + Y_0,$$

the second vertical coordinate $Y_2$ of the texture coordinates is $Y_0$. When the first horizontal coordinate $X_1$ is larger than the first threshold i, it is determined the second horizontal coordinate is $$X_1 - \left(\frac{i}{a/b}\right) * c.$$

When the first vertical coordinate $Y_1$ is larger than the first threshold i, it is determined the second vertical coordinate $Y_2$ is $$Y_1 - \left(\frac{i}{a/b}\right) * d.$$

When the second horizontal coordinate is smaller than the second threshold j, it is determined the second horizontal coordinate is the second threshold j, the first horizontal coordinate is $$\frac{i}{a/b} * c.$$

If the reference horizontal coordinate and the reference vertical coordinate are both smaller than the first threshold i, a first horizontal coordinate $X_1$ of the texture coordinates is the first threshold i, a second horizontal coordinate $X_2$ of the texture coordinates is the second threshold j, a first vertical coordinate $Y_1$ of the texture coordinates is the first threshold i, and a second vertical coordinate $Y_2$ of the texture coordinates is the second threshold j.

The $x_0$ is the horizontal coordinate of the zoom center point in the current video frame; $y_0$ is the vertical coordinate of the zoom center point in the current video frame; a is the first threshold i;

$$b = n_y * \frac{viewWidth}{viewHeight} * \frac{ImageHeight}{ImageWidth}; c = \frac{viewWidth}{viewHeight} * \frac{ImageHeight}{ImageWidth};$$

d is the first threshold i; $n_x$ is the zoom ratio for the horizontal axis of the current video frame; $n_y$ is the zoom ratio for the vertical axis of the current video frame.

The second threshold j is the minimal coordinate value in the coordinate system of the video frame. For example, when the coordinate system is the coordinate system as shown in FIG. 1D, the second threshold is 0.

At block 205, an area defined by the texture coordinates are determined to be the target image area.

After obtaining the texture coordinates, the video player application may determine the area defined by the texture coordinates in the current video frame as the target image area.

At block 206, when video frames subsequent to the current video frame are played, vertex coordinates of the playing window may be calculated according to the reference horizontal coordinate and the reference vertical coordinate.

In an example, the reference horizontal coordinate may be assumed to be xCord; the reference vertical coordinate to be yCord.

The vertex coordinates may be: (xCord, -yCord), (xCord, yCord), (xCord, yCord), and (-xCord, -yCord).

At block 207, when video frames subsequent to the current video frame are played, image content in the target image area of the subsequent video frames are rendered in an area defined by the vertex coordinates according to the texture coordinates.

The act of a user zooming an area of a video frame means the user is interested in image content in the area within the video frame. Therefore, the video player application may directly render image content in the area defined by the texture coordinates of subsequent video frames in the area defined by the vertex coordinates. The video player application may render the image content using the Open Graphics Library (OpenGL).

In an example, the video player application may present image content according to the above method when presenting the k'th frame subsequent to the current video frame because it may take some time for the video player application to calculate the texture coordinates and the vertex coordinates. If the calculation does not take much time, e.g., the video player application has obtained the calculated texture coordinates and the vertex coordinates before playing the next image frame of the current video frame, the video player application may present image content according to the above method when playing the next video frame of the current frame. According to various examples, image content may be presented according to the above method as long as the texture coordinates and the vertex coordinates have been calculated, and the implementation of the method is not limited.

In addition, after the video player application presents image contents of subsequent video frames in response to the zoom request of the user, the user may selectively dragging image content rendered in the playing window when the user wants to adjust the display position of the video frames. That is, the video player application may also perform the following procedures.

(1) A drag request may be received. The drag request is for dragging image content rendered in the playing window, and the image content is image content within the target image area in the k'th video frame of the subsequent video frames. The k is a positive integer.

Figure 2D:
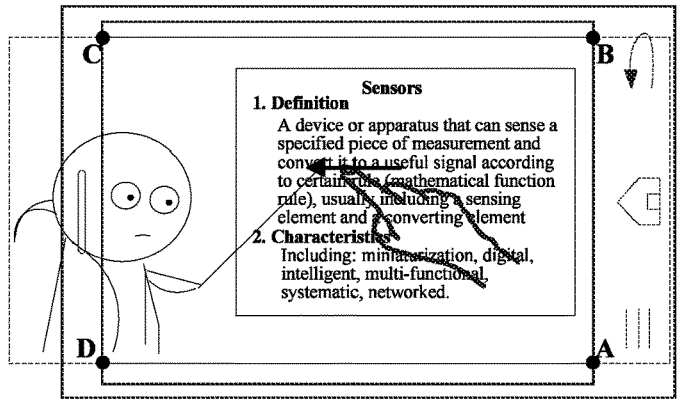
FIG. 2D is a schematic diagram illustrating a user drags image content in accordance with embodiments of the present disclosure.

For example, referring to FIG. 2D, when the user wants to drag tutorial content in the video frame as shown in FIG. 1E into the center of the playing window, the user may trigger a drag request by performing a leftward dragging in the video frame presented by the video player application. Accordingly, the video player application may receive the drag request.

(2) The target image area is adjusted according to the drag request, and the adjusted target image area includes an area in the k'th video frame to be presented in the playing window after the dragging.

The video player application may adjust the target image area according to the received drag request. The adjusted target image area may include an area in the k'th video frame to be presented in the playing window after dragging. In an example, this procedure may include: calculating adjusted texture coordinates according to the drag request; taking an area defined by the adjusted texture coordinates as the adjusted target image area. In an example, the method of the video player application calculates the adjusted texture coordinates may include: obtaining a dragging displacement corresponding to the drag request; calculating adjusted texture coordinates according to the texture coordinates before the adjustment and the dragging displacement. That is, the texture coordinates may include coordinates of at least two vertexes of a playing window presenting the dragged current video frame in an un-zoomed version of the current video frame. The at least two vertexes may include diagonal vertexes of the playing window.

Figure 2E:
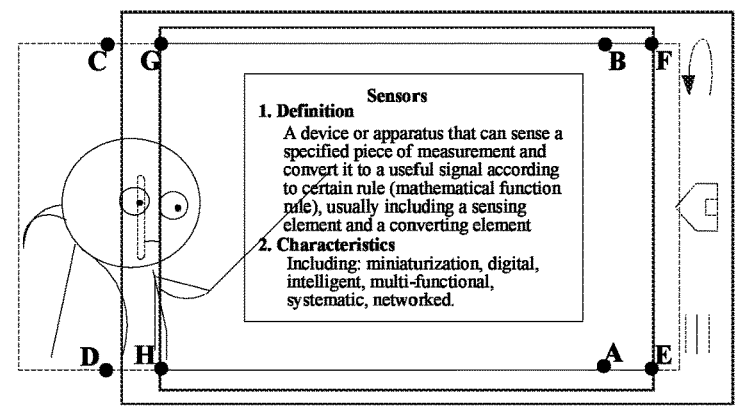
FIG. 2E is a schematic diagram illustrating a target image area after adjustment in accordance with embodiments of the present disclosure.
Figure 2E:
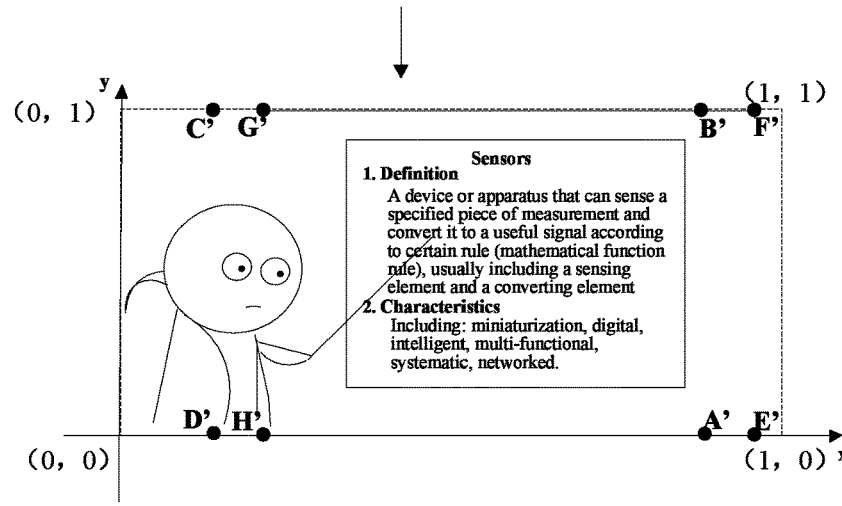

For example, referring to FIG. 2E, after the user performed the dragging, the image area to be presented in the playing window is the area defined by E, F, G and H. The video player application may calculate coordinates of E', F', G' and H', and take the area defined by E', F', G' and H' as the adjusted target image area.

(3) When playing a video frame subsequent to the k'th video frame, image content of the video frame that falls in the adjusted target image area is rendered in the playing window.

Afterwards, when playing a video frame subsequent to the k'th video frame, the video player application may render image content of the video frame that falls within the adjusted target image area in the playing window. This procedure is similar to the procedure in block 207.

In addition, when the user wants to return to the play mode used before the zooming, the user may perform an action on a recover button presented in the playing interface of the video player application, e.g., the video player application may perform the following procedures.

(1) A recover request may be received via the recover button.

Figure 2F:
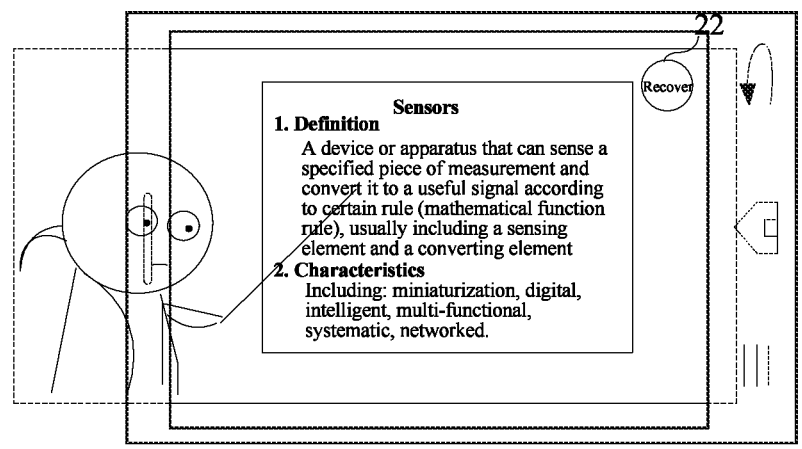
FIG. 2F is a schematic diagram illustrating a recover button presented by a video player application in accordance with embodiments of the present disclosure.

For example, referring to FIG. 2F, when the user wants to zoom to return to the play mode used before the zooming after watching a video for a period of time under the mode as shown in the upper figure of FIG. 2E, the user may click on the recover button 22 as shown in FIG. 2F, and correspondingly, the video player application may receive the recover request via the recover button 22.

(2) Video frames to be played are played according to the play mode used before the zooming according to the zoom request in response to the recover request.

After receiving the recover request, the video player application may use the play mode as shown in FIG. 2B, e.g., using the same play center point and zoom ratio with that of the video frame as shown in FIG. 2B, to play the pending video frames.

In view of the foregoing, the method of various embodiments provides receiving a zoom request, determining a target image area to be displayed in a playing window from a zoomed version of the current frame according to the zoom request, image in the target image area in each frame after the current frame is rendered in the playing window when each frame subsequent to the current frame is played. Thus, the technical scheme solves the problem that the user may be unable to see details in a video clearly even after the video is played at full screen, e.g., the problem that related art cannot satisfy demands of users. As such, a user is enabled to selectively zooming video frames according to the needs, thus can clearly see details in the video.

By directly rendering image content within the target image area in the playing window without decoding the whole video frame and cropping the video frame to obtain the image content in the target image area, the processing complexity at the video player application can be reduced.

After a drag request is received, adjusted texture coordinates may be calculated and an area defined by the adjusted texture coordinates may be regarded as the adjusted target image area. As such, when subsequent video frames are played, image content within the adjusted target image area is rendered in the playing window, such that the user is enabled to adjust content of video frames that is presented in the playing window according to the needs of the user watching the video during play of the video. Thus, users' demand for watching a video can be better satisfied.

Figure 3:
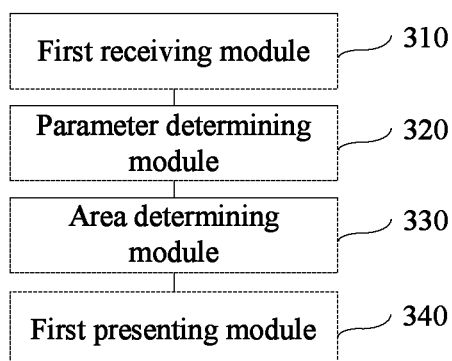
FIG. 3 is a block diagram illustrating an apparatus of zooming video images in accordance with embodiments of the present disclosure.

FIG. 3 is a schematic diagram illustrating an apparatus of zooming video images in accordance with embodiments of the present disclosure. The apparatus may include: a first receiving module 310, a parameter determining module 320, an area determining module 330 and a first presenting module 340.

The first receiving module 310 may receive a zoom request for zooming a current video frame while a video is being played.

The parameter determining module 320 may determine a zoom center point and a zoom ratio according to the zoom request. The area determining module 330 may determine a target image area to be presented in a playing window from a zoomed version of the current video frame according to the zoom center point and the zoom ratio.

The first presenting module 340 may render in the playing window image content within the target image area of subsequent video frames of the current video frame when playing the subsequent video frames.

In view of the foregoing, the apparatus of various embodiments provides receiving a zoom request, determining a target image area to be displayed in a playing window from a zoomed version of the current frame according to the zoom request, image in the target image area in each frame after the current frame is presented in the playing window when each frame subsequent to the current frame is played. Thus, the technical scheme solves the problem that the user may be unable to see details in a video clearly even after the video is played at full screen, e.g., the problem related art cannot satisfy demands of users. As such, a user is enabled to selectively zooming video frames according to the needs, thus can clearly see details in the video.

Figure 4:
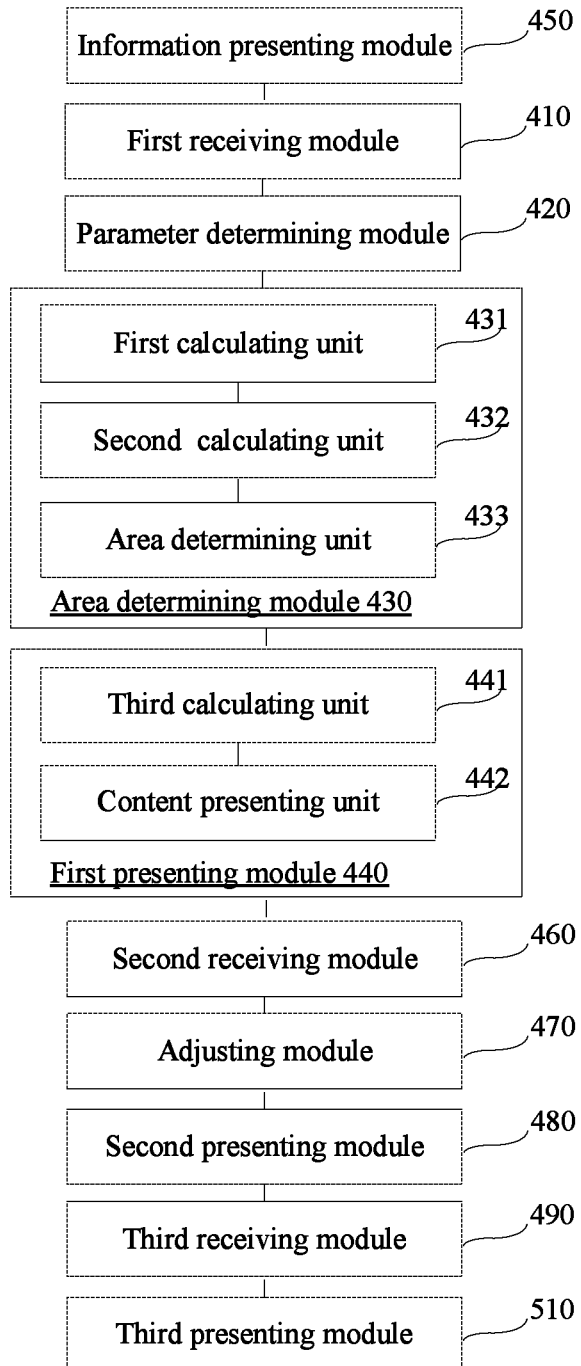
FIG. 4 is a block diagram illustrating an apparatus of zooming video images in accordance with embodiments of the present disclosure.

FIG. 4 is a schematic diagram illustrating an apparatus of zooming video images in accordance with embodiments of the present disclosure. The apparatus may include: a first receiving module 410, a parameter determining module 420, an area determining module 430 and a first presenting module 440.

The first receiving module 410 may receive a zoom request for zooming a current video frame while a video is being played.

The parameter determining module 420 may determine a zoom center point and a zoom ratio according to the zoom request.

The area determining module 430 may determine a target image area to be presented in a playing window from a zoomed version of the current video frame according to the zoom center point and the zoom ratio.

The first presenting module 440 may render in the playing window image content within the target image area in subsequent video frames of the current video frame when playing the subsequent video frames.

In an example, the first receiving module 410 may also:
receive a stretch gesture applied to the current video frame and determine the stretch gesture to be a magnify request; or
receive a shrink gesture applied to the current video frame, and determine the shrink gesture to be a minify request.

In an example, the apparatus may also include:

an information presenting module 450, to present zoom guidance information for guiding the user to zoom the video frame.

In an example, the apparatus may also include:

a second receiving module 460, to receive a drag request for dragging image content presented in the playing window which is image content within the target image area in the k'th video frame of the subsequent video frames; The k is a positive integer;

an adjusting module 470, to adjust the target image area according to the dragging request so that the adjusted target image area includes an area in the k'th video frame to be presented in the playing window after the dragging;

a second presenting module 480, to render image content of a video frame that falls in the adjusted target image area in the playing window when playing video frames subsequent to the k'th video frame.

In an example, the apparatus may also include:

a third receiving module 490, to receive a recover request via a recover button;

a third presenting module 510, to play video frames to be played after the recover request is received according to the play mode used before the zooming according to the zoom request.

In an example, the area determining module 430 may include:

a first calculating unit 413, to calculate a reference horizontal coordinate and a reference vertical coordinate according to the zoom ratio;

a second calculating unit 432, to calculate coordinate values of texture coordinates according to the zoom center point, the reference horizontal coordinate and the reference vertical coordinate;

the texture coordinates may include coordinates of at least two vertexes of the playing window in a zoomed version of the current video frame, the at least two vertexes may include diagonal vertexes of the playing window;

an area determining unit 433, to determine an area defined by the texture coordinates as the target image area.

In an example, the first presenting module 440 may include:

a third calculating unit 441, to calculate vertex coordinates of the playing window according to the reference horizontal coordinate and the reference vertical coordinate;

a content presenting unit 442, to render image content within the target image area of subsequent video frames in an area corresponding to the vertex coordinates according to the texture coordinates.

In an example, the third calculating unit 442 may also:

assuming the reference horizontal coordinate to be xCord; the reference vertical coordinate to be yCord;

determine the vertex coordinates to be: (xCord, −yCord), (xCord, yCord), (−xCord, yCord), and (−xCord, −yCord).

In an example, the first calculating unit 431 may also:

if the zoom ratio is smaller than 1, determine the reference horizontal coordinate to be:

$$xCord = n_x * \frac{viewHeight}{viewWidth} * \frac{ImageWidth}{ImageHeight};$$

determine the reference vertical coordinate to be:

$$yCord = n_y * \frac{viewWidth}{viewHeight} * \frac{ImageHeight}{ImageWidth};$$

$n_x$ is the zoom ratio for the horizontal axis of the current video frame; $n_y$ is the zoom ratio for the vertical axis of the current video frame; viewWidth is the width of the displaying area in the playing window; viewHeight is the height of the displaying area in the playing window; ImageWidth is the width of the current video frame; ImageHeight is the height of the current video frame.

In an example, the first calculating unit 431 may also:

if the zoom ratio is larger than 1, obtain a first value which is $$\frac{viewHeight}{viewWidth} * \frac{ImageWidth}{ImageHeight};$$

if the first value reaches a first threshold, determine the reference horizontal coordinate xCord to be the first threshold;

obtain a second value which is $$n_y * \frac{viewWidth}{viewHeight} * \frac{ImageHeight}{ImageWidth};$$

if the second value reaches the first threshold, determine the reference vertical coordinate yCord to be the first threshold;

if the second value does not reach the first threshold, determine the reference vertical coordinate yCord to be the second value;

$n_y$ is the zoom ratio for the vertical axis of the current video frame; viewWidth is the width of the displaying area of the playing window; viewHeight is the height of the displaying area of the playing window; ImageWidth is the width of the current video frame; ImageHeight is the height of the current video frame.

In an example, the first calculating unit 431 may also:

if the first value does not reach the first threshold, determine the reference vertical coordinate yCord to be the first threshold;

obtain a third value which is $$n_x * \frac{viewHeight}{viewWidth} * \frac{ImageWidth}{ImageHeight};$$

$n_x$ is the zoom ratio for the horizontal axis of the current video frame;

if the third value reaches the first threshold, determine the reference horizontal coordinate xCord to be the first threshold;

if the third value does not reach the first threshold, determine the reference horizontal coordinate xCord to be the third value.

In an example, the second calculating unit 432 may also:

obtain a target horizontal coordinate and a target vertical coordinate of the zoom center point; determine the target horizontal coordinate to be:

$$X_0 = \frac{x_0}{viewWidth * n_x};$$

the target vertical coordinate may be:

$$Y_0 = \frac{y_0}{viewHeight * n_y}.$$

if the reference horizontal coordinate is smaller than the first threshold i and the reference vertical coordinate is the first threshold i, determine a first horizontal coordinate $X_1$ of the texture coordinates to be the first threshold i, a second horizontal coordinate $X_2$ of the texture coordinates to be a second threshold j, a first vertical coordinate $Y_1$ of the texture coordinates to be $$\frac{i}{n_y} + Y_0,$$

a second vertical coordinate $Y_2$ of the texture coordinates to be $Y_0$; when the first vertical coordinate $Y_1$ reaches the first threshold i, determine the first vertical coordinate $Y_1$ is the first threshold i, the second vertical coordinate $Y_2$ is $$Y_1 - \frac{i}{n_y};$$

if the reference vertical coordinate is smaller than the first threshold i and the reference horizontal coordinate is the first threshold i, a first horizontal coordinate $X_1$ of the texture coordinates is $$\frac{i}{n_x} + X_0,$$

a second horizontal coordinate $X_2$ of the texture coordinates is $X_0$, a first vertical coordinate $Y_1$ of the texture coordinates is the first threshold i, a second vertical coordinate $Y_2$ of the texture coordinates is the second threshold j; when the first horizontal coordinate $X_1$ is larger than the first threshold i, determine the first horizontal coordinate $X_1$ is the first threshold i, the second horizontal coordinate $X_2$ is $$X_1 - \frac{i}{n_x};$$

when the second horizontal coordinate $X_2$ does not reach the second threshold j, determine the first horizontal coordinate $X_1$ is $$\frac{i}{n_x},$$

the second horizontal coordinate $X_2$ is the second threshold j;
if the reference horizontal coordinate and the reference vertical coordinate are both the first threshold i, obtain the value of a first parameter a, the value of a second parameter b, the value of a third parameter c and the value of a fourth parameter d may be obtained; determine the first horizontal coordinate $X_1$ of the texture coordinates is $$\frac{i}{a/b} * c + X_0,$$

the second horizontal coordinate $X_2$ of the texture coordinates is $X_0$, the first vertical coordinate $Y_1$ of the texture coordinates is $$\frac{i}{a/b} * d + Y_0,$$

the second vertical coordinate $Y_2$ of the texture coordinates is $Y_0$; when the first horizontal coordinate $X_1$ is larger than the first threshold i, determine the second horizontal coordinate is $$X_1 - \left(\frac{i}{a/b}\right) * c;$$

when the first vertical coordinate $Y_1$ is larger than the first threshold i, determine the second vertical coordinate $Y_2$ is $$Y_1 - \left(\frac{i}{a/b}\right) * d;$$

when the second horizontal coordinate is smaller than the second threshold j, determine the second horizontal coordinate is the second threshold j, the first horizontal coordinate is $$\frac{i}{a/b} * c;$$

if the reference horizontal coordinate and the reference vertical coordinate are both smaller than the first threshold i, determine a first horizontal coordinate $X_1$ of the texture coordinates is the first threshold i, a second horizontal coordinate $X_2$ of the texture coordinates is the second threshold j, a first vertical coordinate $Y_1$ of the texture coordinates is the first threshold i, a second vertical coordinate $Y_2$ of the texture coordinates is the second threshold j;
wherein $x_0$ is the horizontal coordinate of the zoom center point in the current video frame; $y_0$ is the vertical coordinate of the zoom center point in the current video frame; a is the first threshold i;

$$b = n_y \frac{viewWidth}{viewHeight} * \frac{ImageHeight}{ImageWidth}; c = \frac{viewWidth}{viewHeight} * \frac{ImageHeight}{ImageWidth};$$

d is the first threshold i; $n_x$ is the zoom ratio for the horizontal axis of the current video frame; $n_y$ is the zoom ratio for the vertical axis of the current video frame.

In view of the foregoing, the apparatus of various embodiments provides receiving a zoom request, determining a target image area to be displayed in a playing window from a zoomed version of the current frame according to the zoom request, image in the target image area in each frame after the current frame is presented in the playing window when each frame subsequent to the current frame is played. Thus, the technical scheme solves the problem that the user may be unable to see details in a video clearly even after the video is played at full screen, e.g., the problem related art cannot satisfy demands of users. As such, a user is enabled to selectively zooming video frames according to the needs, thus can clearly see details in the video.

Figure 5:
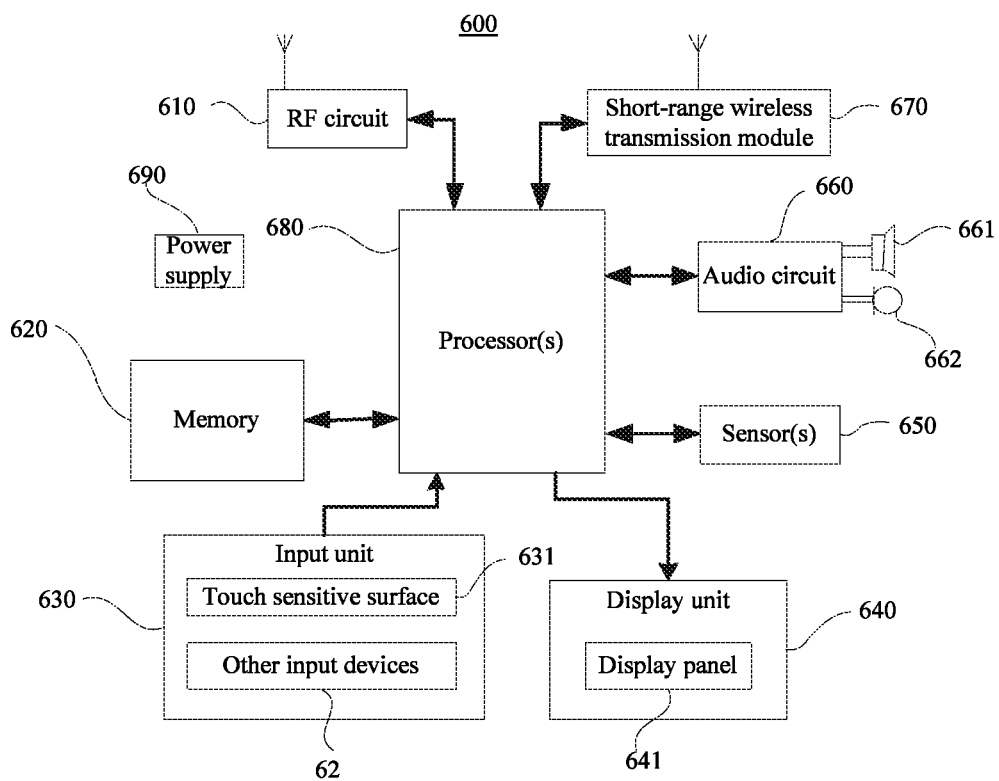
FIG. 5 is a schematic diagram illustrating modules of a mobile terminal in accordance with embodiments of the present disclosure.

FIG. 5 is a schematic diagram illustrating modules of a mobile terminal in accordance with embodiments of the present disclosure. A video player application may run in the mobile terminal 600. The specific components are as follows.

The mobile terminal 600 may include a radio frequency (RF) circuit 610, at least one memory of computer-readable storage medium 620, an input unit 630, a display unit 640, at least one sensor 650, an audio circuit 660, a wireless fidelity (WiFi) unit 670, at least one processor 680 and a power supply 6390 and the like. The structure as shown in FIG. 5 is not for restricting the terminal device. The terminal device of various examples may include extra components or may include fewer components, or may have some of the components integrated into one component, or may have a different deployment of the components.

The RF circuit 610 is capable of sending and receiving signals during a process of information sending/receiving process or a voice communication process. In an example, the RF circuit 610 may send downlink information received from a base station to the at least one processor 680 for further processing, and may send uplink data to the base station. The RF circuit 610 may generally include, but not limited to, an antenna, at least one amplifier, a tuner, at least one oscillator, a subscriber identity module (SIM) card, a transceiver, a coupler, a low noise amplifier (LNA), a duplexer, and the like. The RF circuit 610 may perform wireless communications with a network and other devices. The wireless communication may adopt any communication standard or protocol, including but not limited to: global system of mobile communication (GSM), general packet radio service (GPRS), code division multiple access (CDMA), wideband code division multiple access (WCDMA), long term evolution (LTE), email, short messaging service (SMS), or the like. The storage medium 620 may be used for storing software programs and modules. For example, the storage medium 620 may store a pre-determined time list, a software program for collecting voice signals, a software program for identifying key words, a software program for continuous speech recognition, a software program for setting events and alerts, and store relationships which associates wireless access points with user accounts, or the like. The processor 680 may be capable of executing the software programs and modules stored in the storage device 620 to implement various functions and data processing. The storage medium 620 may mainly include program storage sections and data storage sections. The program storage sections may store an operating system, applications required for implementing at least one function (such as video playing function, image display function, touch screen recognition function, or the like). The data storage sections may store data generated during usage of the mobile terminal 600, or the like. In addition, the storage medium 620 may include a high-speed random access memory, and may also include a non-transitory memory, e.g., at least one disk storage, flash memory or other non-transitory solid state storage device and the like. Correspondingly, the storage device 620 may also include a storage controller to provide the processor 680 and the inputting unit 630 with access to the storage device 620.

The input unit 630 may receive digits or characters inputted, and generate a keyboard input signal, a mouse input signal, a control lever input signal, an optical input signal, or a track ball input signal which is related with user settings and function controlling. In an example, the input unit 630 may include a touch sensitive surface 631 and other inputting devices 632. The touch sensitive surface 631, also referred to as a touch screen or a touchpad, is capable of collecting touch operations performed by a user on the surface or near the surface (e.g., an operation performed on or near the touch sensitive surface 631 using any proper object or attachment such as a finger or a touch pen and etc.), and driving a connecting apparatus corresponding to the operation according to a pre-defined procedure. In an example, the touch sensitive surface 631 may include a touch detecting apparatus and a touch controller. The touch detecting apparatus detects the position touched by the user, detects a signal generated by the touch, and sends the signal to the touch controller. The touch controller receives touch information from the touch detecting apparatus, converts the touch information into coordinates of the touch position, sends the coordinates to the processor 680, receives a command sent by the processor 680 and executes the command. The touch sensitive surface 631 may be implemented via various types of touch techniques such as resistive touch screen, capacitive touch screen, infrared touch screen and surface acoustic wave touch screen and so on. In an example, the input unit 630 may include another input device 632 besides the touch sensitive surface 631. In an example, the another input device 632 may include, but not limited to, at least one of a physical keyboard, a function key (e.g., a volume control key, a power on/off key and etc.), a track ball, a mouse, a control lever and the like.

The display unit 640 is capable of displaying information inputted by the user, information provided for the user and various graphical user interfaces of the mobile terminal 600. The graphical user interfaces may include any combination of graphics, texts, icons, videos. The display unit 640 may include a display panel 641. In an example, the display panel 641 may be implemented by Liquid Crystal Display (LCD), Organic Light-Emitting Diode (OLED) and the like. In an example, the touch sensitive surface 661 may overlay the display panel 641. When detecting a touch operation on or near the touch sensitive surface 661, the touch sensitive surface 661 may send the touch operation to the processor 680 to determine the type of the touch event. Then the processor 680 may provide visual output on the display panel 641 according to the type of the touch event. Although the touch sensitive surface 661 and the display panel 641 are depicted as two independent components respectively for input and output in FIG. 5, the touch sensitive surface 661 and the display panel 641 may be integrated to provide input and output in various examples.

The mobile terminal 600 may also include at least one sensor 650, e.g., an optical sensor, a motion sensor, or other types of sensors. In an example, the optical sensor may include an ambient light sensor and a proximity sensor. The ambient light sensor may adjust the brightness of the display panel 641 according to the strength of ambient light. The proximity sensor may close the display panel 641 and/or the light when the mobile terminal 600 is held close to an ear. A gravity sensor is a type of motion sensor, may detect the amount of acceleration in multiple directions (typically XYZ-axis), the amount and the direction of gravity when kept in stationary, and can be used in applications which need to identify phone postures (such as auto screen rotation, games using the sensing result, magnetometer attitude calibration), features related with vibration identify (such as a pedometer, percussion) and the like. The mobile terminal 600 may include other sensors, e.g., a gyroscope, a barometer, a hygrometer, a thermometer, infrared sensors and the like, which are not listed further herein.

The audio circuit 660, the speaker 661 and the microphone 662 may provide an audio interface between the user and the mobile terminal device 600. An audio circuit 660 may convert received audio data into electrical signals, and send the electrical signals to the speaker 661. The speaker 661 may convert the electrical signals into sound and outputs the sound. The microphone 662 may convert collected sound signals into electrical signals which are received by the audio circuit 660. The audio circuit 660 may convert the electrical signals into audio data, and sends the electrical signals to the processor 680 for processing. The processed audio data may be sent to another terminal device via the RF circuit 610, or be output to the storage device 620 for further processing. The audio circuit 660 may also include an ear jack providing communications between a peripheral earphone and the mobile terminal 600.

The short-distance wireless communication module 670 may be a wireless fidelity (WiFi) module or a Bluetooth module, or the like. The mobile terminal 600 may adopt a WiFi module 270 to provide wireless broadband Internet access to enable a user to send and receive emails, browse webpages and access stream media and so on. In an example, the terminal device 600 may not include the WiFi module 670 although it is shown in FIG. 5. The structure in FIG. 5 is merely an example, modifications can be made as long as they do not change the mechanism of the examples.

The processor 680 is a control center of the mobile terminal 600 which interconnects all of the components in the phone using various interfaces and circuits and monitors the phone by running or executing software programs and/or modules stored in the storage device 620 and calling various functions of the mobile terminal 600 and processing data. The processing unit 680 may include one or multiple processing cores. In an example, the processing unit 680 may integrate an application processor and a modem processor. The application processor mainly handles the operating system, user interfaces and application programs, and etc., and the modem processor mainly handles wireless communications. The modem may not be integrated into the processor 680.

The mobile terminal 600 may also include a power supply 690 (e.g., a battery) providing power for various parts. In an example, the power supply may be logically connected with the processor 680 via a power supply management system to implement functions such as charging, discharging, power management and the like. The power supply 690 may also include any components such as one or multiple AC or DC power supply, a recharging system, a power failure detection circuit, a power converter or inverter, a power status indicator and the like.

Although not shown in the figures, the mobile terminal 600 may also include a camera, a Bluetooth module and the like, which is not described further herein.

The mobile terminal 600 may also include a storage device and at least one program which may be executed by at least one processor to implement the method of zooming video images of various examples.

According to an example, a non-transitory computer-readable storage medium including instructions, e.g., a storage device including instructions, is also provided. The instructions may be executable by a processor at the mobile terminal to implement the method of zooming video images.

For example, the non-transitory computer-readable storage medium may be ROM, RAM, CD-ROM, magnetic tape, floppy disc, optical storage device, or the like.

The above description of the apparatus of zooming video images takes the above modules as an example. In practice, the functions may be re-divided to be implemented by different modules, e.g., the apparatus may have a different inner structure composed of different modules to implement all or some of the above functions. In addition, the above methods of zooming video images provided by the examples belong to the same conceptive idea. Details have been described in the above, and will not be repeated herein.

The index numbers of the examples are merely for facilitating description, and should not be interpreted to be representative for the preference order of the examples.

Those skilled in the art can understand that some or all of the steps of the methods provided by the embodiments may be implemented by hardware controlled by software. The software may be stored in a computer-readable storage medium.

The foregoing is only embodiments of the present specification. The protection scope of the present specification, however, is not limited to the above. All the modifications, equivalent replacements or improvements, which can be obtained by those skilled in the art, are included within the protection scope of the present specification.

The invention claimed is:

1. A method of zooming video images, comprising:
   at a video player application, receiving a zoom request for zooming a current video frame while a video is being played in a playing window;
   determining a zoom center point and a zoom ratio according to the zoom request;
   determining vertex coordinates of a target image area of the current video frame according to the zoom center point and the zoom ratio, the vertex coordinates are coordinates of vertices of the playing window, when a zoomed version of the current video frame corresponding to the zoom request is displayed in the playing window, in a coordinate system established using the current video frame; and
   rendering, in the playing window, image content within the target image area defined by the vertex coordinates of video frames subsequent to the current video frame when playing the subsequent video frames;
   wherein determining vertex coordinates of a target image area according to the zoom center point and the zoom ratio comprises:
      calculating a reference horizontal coordinate and a reference vertical coordinate according to the zoom ratio;
      calculating texture coordinates according to the zoom center point, the reference horizontal coordinate and the reference vertical coordinate; wherein the texture coordinates comprises at least two of the vertex coordinates; and
      determining an area defined by the texture coordinates to be the target image area.

2. The method of claim 1, wherein calculating vertex coordinates of the playing window according to the reference horizontal coordinate and the reference vertical coordinate comprises:
   if the zoom ratio is smaller than 1, determining the reference vertical coordinate is $$xCord = n_x * \frac{viewHeight}{viewWidth} * \frac{ImageWidth}{ImageHeight};$$

determining the reference vertical coordinate is $$yCord = n_y * \frac{viewWidth}{viewHeight} * \frac{ImageHeight}{ImageWidth};$$

wherein, $n_x$ is a zoom ratio for a horizontal axis of the current video frame; $n_y$ is a zoom ratio for a vertical axis of the current video frame; viewWidth his the width of a displaying area of the playing window; viewHeight is the height of the displaying area of the playing window; ImageWidth his the width of the current video frame; ImageHeight is the height of the current video frame.

3. The method of claim 1, wherein calculating vertex coordinates of the playing window according to the reference horizontal coordinate and the reference vertical coordinate comprises:
if the zoom ratio is larger than 1, obtaining a first value which is $$\frac{viewHeight}{viewWidth} * \frac{ImageWidth}{ImageHeight};$$

if the first value reaches a first threshold, determining the reference horizontal coordinate xCord to be the first threshold;
obtaining a second value which is $$n_y * \frac{viewWidth}{viewHeight} * \frac{ImageHeight}{ImageWidth};$$

if the second value reaches the first threshold, determining the reference vertical coordinate yCord to be the first threshold;
if the second value does not reach the first threshold, determining the reference vertical coordinate yCord to be the second value;
wherein, $n_y$ is a zoom ratio for a horizontal axis of the current video frame; viewWidth his the width of a displaying area in the playing window; viewHeight is the height of the displaying area in the playing window; ImageWidth is the width of the current video frame; ImageHeight is the height of the current video frame.

4. The method of claim 3, further comprising:
if the first value does not reach the first threshold, determining the reference vertical coordinate yCord to be the first threshold;
obtaining a third value which is $$n_x * \frac{viewHeight}{viewWidth} * \frac{ImageWidth}{ImageHeight};$$

wherein $n_x$ is the zoom ratio for a horizontal axis of the current video frame;
if the third value reaches the first threshold, determining the reference horizontal coordinate xCord to be the first threshold; and
if the third value does not reach the first threshold, determining the reference horizontal coordinate xCord to be the third value.

5. The method of claim 1, wherein calculating coordinate values of the texture coordinates according to the zoom ratio, the reference horizontal coordinate and the reference vertical coordinate comprises:
obtaining a target horizontal coordinate and a target vertical coordinate of the zoom center point; determining the target horizontal coordinate to be:

$$X_0 = \frac{x_0}{viewWidth * n_x};$$

determining the target vertical coordinate to be:

$$Y_0 = \frac{y_0}{viewHeight * n_y};$$

if the reference horizontal coordinate is smaller than a first threshold i and the reference vertical coordinate is the first threshold i, a first horizontal coordinate $X_1$ of the texture coordinates is the first threshold i, a second horizontal coordinate $X_2$ of the texture coordinates is a second threshold j, a first vertical coordinate $Y_1$ of the texture coordinates is $$\frac{i}{n_y} + Y_0,$$

a second vertical coordinate $Y_2$ of the texture coordinates is $Y_0$; wherein when the first vertical coordinate $Y_1$ reaches the first threshold i, determining the first vertical coordinate $Y_1$ is the first threshold i, the second vertical coordinate $Y_2$ is $$Y_1 - \frac{i}{n_y};$$

if the reference vertical coordinate is smaller than the first threshold i and the reference horizontal coordinate is the first threshold i, a first horizontal coordinate $X_1$ of the texture coordinates is $$\frac{i}{n_x} + X_0,$$

a second horizontal coordinate $X_2$ of the texture coordinates is $X_0$, a first vertical coordinate $Y_1$ of the texture coordinates is the first threshold i, a second vertical coordinate $Y_2$ of the texture coordinates is a second threshold j; wherein when the first horizontal coordinate $X_1$ is larger than the first threshold i, determining the first vertical coordinate $X_1$ is the first threshold i, the second vertical coordinate $X_2$ is $$X_1 - \frac{i}{n_x};$$

when the second horizontal coordinate $X_2$ does not reach the second threshold j, determining the first horizontal coordinate $X_1$ is $$\frac{i}{n_x},$$

the second horizontal coordinate $X_2$ is the second threshold j;
if the reference horizontal coordinate and the reference vertical coordinate are both the first threshold, obtaining a value of a first parameter a, a value of a second parameter b, a value of a third parameter c and a value of a fourth parameter d;
determining the first horizontal coordinate $X_1$ of the texture coordinates is $$\frac{i}{a/b} * c + X_0,$$

the second horizontal coordinate $X_2$ of the texture coordinates is $X_0$, the first vertical coordinate $Y_1$ of the texture coordinates is $$\frac{i}{a/b} * d + Y_0,$$

the second vertical coordinate $Y_2$ of the texture coordinates is $Y_0$;
wherein when the first horizontal coordinate $X_1$ is larger than the first threshold i, determining the second horizontal coordinate is $$X_1 - \left(\frac{i}{a/b}\right) * c;$$

when the first vertical coordinate $Y_1$ is larger than the first threshold i, determining the second vertical coordinate $Y_2$ is $$Y_1 - \left(\frac{i}{a/b}\right) * d;$$

when the second horizontal coordinate is smaller than the second threshold j, determining the second horizontal coordinate is the second threshold j, the first horizontal coordinate is $$\frac{i}{a/b} * c;$$

if the reference horizontal coordinate and the reference vertical coordinate are both smaller than the first threshold i, a first horizontal coordinate $X_1$ of the texture coordinates is the first threshold i, a second horizontal coordinate $X_2$ of the texture coordinates is a second threshold j, a first vertical coordinate $Y_1$ of the texture coordinates is the first threshold i, a second vertical coordinate of the texture coordinates is the second threshold j;
wherein $x_0$ is a horizontal coordinate of the zoom center point in the current video frame;
$y_0$ is the vertical coordinate of the zoom center point in the current video frame;
a is the first threshold i;

$$b = n_y * \frac{viewWidth}{viewHeight} * \frac{ImageHeight}{ImageWidth}; \quad c = \frac{viewWidth}{viewHeight} * \frac{ImageHeight}{ImageWidth};$$

d is the first threshold i;
$n_x$ is a zoom ratio for a horizontal axis of the current video frame;
$n_y$ is a zoom ratio for a vertical axis of the current video frame.

6. The method of claim 1, wherein receiving a zoom request for zooming a current video frame comprises:
receiving a stretch gesture applied to the current video frame and determining the stretch gesture to be a magnify request; or
receiving a shrink gesture applied to the current video frame and determining the shrink gesture to be a minify request.

7. The method of claim 1, further comprising:
presenting zoom guidance information for guiding a user to zoom video frames.

8. The method of claim 1, further comprising:
receiving a drag request for dragging image content rendered in the playing window that belongs to the target image area of a k'th video frame, wherein the k'th video frame is one of the video frames subsequent to the current video frame; k is a positive integer;
shifting the vertex coordinates to second vertex coordinates according to the drag request to relocate the target image area, wherein the second vertex coordinates are coordinates of vertices of the playing window, when a dragged version of a zoomed k'th video frame corresponding to the drag request is displayed in the playing window, in a coordinate system established using the k'th video frame; and
rendering, in the playing window, image content that falls in the relocated target image area defined by the second vertex coordinates of a video frame subsequent to the k'th video frame when playing video frames subsequent to the k'th video frame.

9. The method of claim 1, further comprising:
receiving a recover request via a recover button; and
playing, in response to the recover request, video frames to be played according to a play mode used before the zooming according to the zoom request.

10. The method of claim 1, wherein calculating vertex coordinates of the playing window according to the reference horizontal coordinate and the reference vertical coordinate comprises:
assuming the reference horizontal coordinate is xCord; the reference vertical coordinate is yCord;
determining the vertex coordinates to be: (xCord, −yCord), (xCord, yCord), (−xCord, yCord), and (−xCord, −yCord).

11. A mobile terminal, comprising:
at least one processor; and
a storage device;
wherein the storage device stores at least one program executable by the at least one processor, the at least one program comprises instructions for:
  receiving a zoom request for zooming a current video frame while a video is being played;
  determining a zoom center point and a zoom ratio according to the zoom request;
  determining vertex coordinates of a target image area to be displayed in a playing window from the current video frame after zooming according to the zoom center point and the zoom ratio; and
  rendering, in the playing window, image content within the target image area defined by the vertex coordinates of video frames subsequent to the current video frame when playing subsequent video frames;
wherein the at least one program comprises instructions for:
  receiving a drag request for dragging image content rendered in playing window that belongs to the target image area of a k'th video frame, wherein the k'th video frame is one of the video frames subsequent to the current video frame; k is a positive integer;
  shifting the vertex coordinates to second vertex coordinates according to the drag request to relocate the target image area, wherein the second vertex coordinates are coordinates of vertices of the playing window, when a dragged version of a zoomed k'th video frame corresponding to the drag request is displayed in the playing window, in a coordinate system established using the k'th video frame; and
  rendering, in the playing window, image content that falls in the relocated target image area defined by the second vertex coordinates of a video frame subsequent to the k'th video frame when playing video frames subsequent to the k'th video frame.

12. The mobile terminal of claim 11, wherein the at least one program comprises instructions for:
  calculating a reference horizontal coordinate and a reference vertical coordinate according to the zoom ratio;
  calculating texture coordinates according to the zoom center point, the reference horizontal coordinate and the reference vertical coordinate;
  wherein the texture coordinates comprises at least two vertexes of the playing window presenting a zoomed version of the current video frame in an un-zoomed version of the current video frame, the at least two vertexes comprises diagonal vertexes of the playing window; and
  determining an area defined by the texture coordinates to be the target image area.

13. The mobile terminal of claim 12, wherein the at least one program comprises instructions for:
  calculating vertex coordinates of the playing window according to the reference horizontal coordinate and the reference vertical coordinate; and
  rendering the image content within the target image area of the subsequent video frames in an area corresponding to the vertex coordinates according to the texture coordinates.

14. The mobile terminal of claim 11, wherein the at least one program comprises instructions for:
  receiving a stretch gesture applied to the current video frame and determining the stretch gesture to be a magnify request; or
  receiving a shrink gesture applied to the current video frame and determining the shrink gesture to be a minify request.

15. The mobile terminal of claim 11, wherein the at least one program comprises instructions for:
  presenting zoom guidance information for guiding a user to zoom video frames.

16. The mobile terminal of claim 11, wherein the at least one program comprises instructions for:
  receiving a recover request via a recover button; and
  playing, in response to the recover request, video frames to be played according to a play mode used before the zooming according to the zoom request.

17. A non-transitory storage medium, comprising computer-readable instructions executable by a processor to:
  receive a zoom request for zooming a current video frame while a video is being played;
  determine a zoom center point and a zoom ratio according to the zoom request;
  determine a target image area to be displayed in a playing window from the current video frame after zooming according to the zoom center point and the zoom ratio; and
  render, in the playing window, image content within the target image area of video frames subsequent to the current video frame when playing subsequent video frames;
  wherein the instructions that cause the processor to determine a target image area to be displayed in a playing window from the current video frame after zooming according to the zoom center point and the zoom ratio cause the processor to:
  calculate a reference horizontal coordinate and a reference vertical coordinate according to the zoom ratio;
  calculate texture coordinates according to the zoom center point, the reference horizontal coordinate and the reference vertical coordinate; wherein the texture coordinates comprises coordinates of at least two vertexes of the playing window presenting a zoomed version of the current video frame in an un-zoomed version of the current video frame, the at least two vertexes comprises diagonal vertexes of the playing window; and
  determine an area defined by the texture coordinates to be the target image area, wherein rendering in the playing window image content within the target image area of video frames subsequent to the current video frame when playing subsequent video frames comprises:
  calculating vertex coordinates of the playing window according to the reference horizontal coordinate and the reference vertical coordinate; and
  rendering the image content within the target image area of the subsequent video frames in an area defined by the vertex coordinates according to the texture coordinates;
  wherein calculating vertex coordinates of the playing window according to the reference horizontal coordinate and the reference vertical coordinate comprises:
  assuming the reference horizontal coordinate is xCord; the reference vertical coordinate is yCord;
  determining the vertex coordinates to be: (xCord, −yCord), (xCord, yCord), (−xCord, yCord), and (−xCord, −yCord).

* * * * *